June 3, 1941.  G. A. STRAYER ET AL  2,244,029
POWER SAW
Filed May 25, 1938
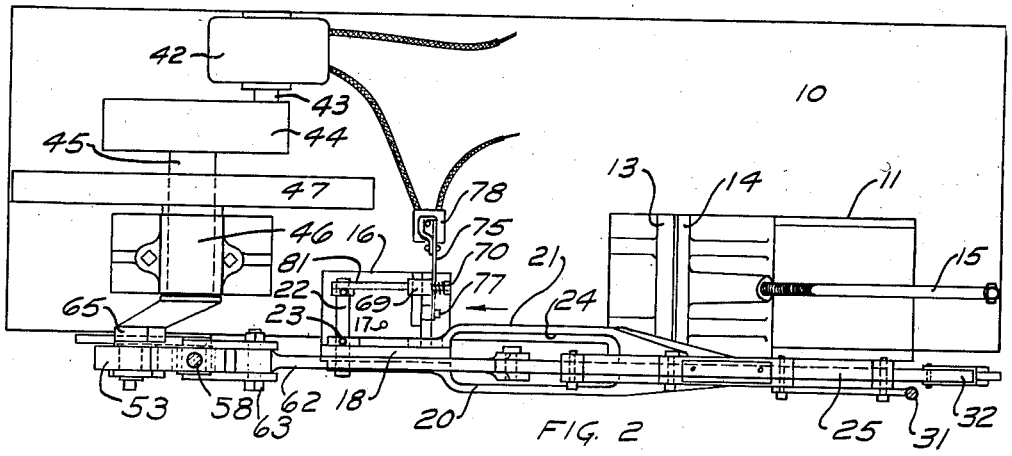
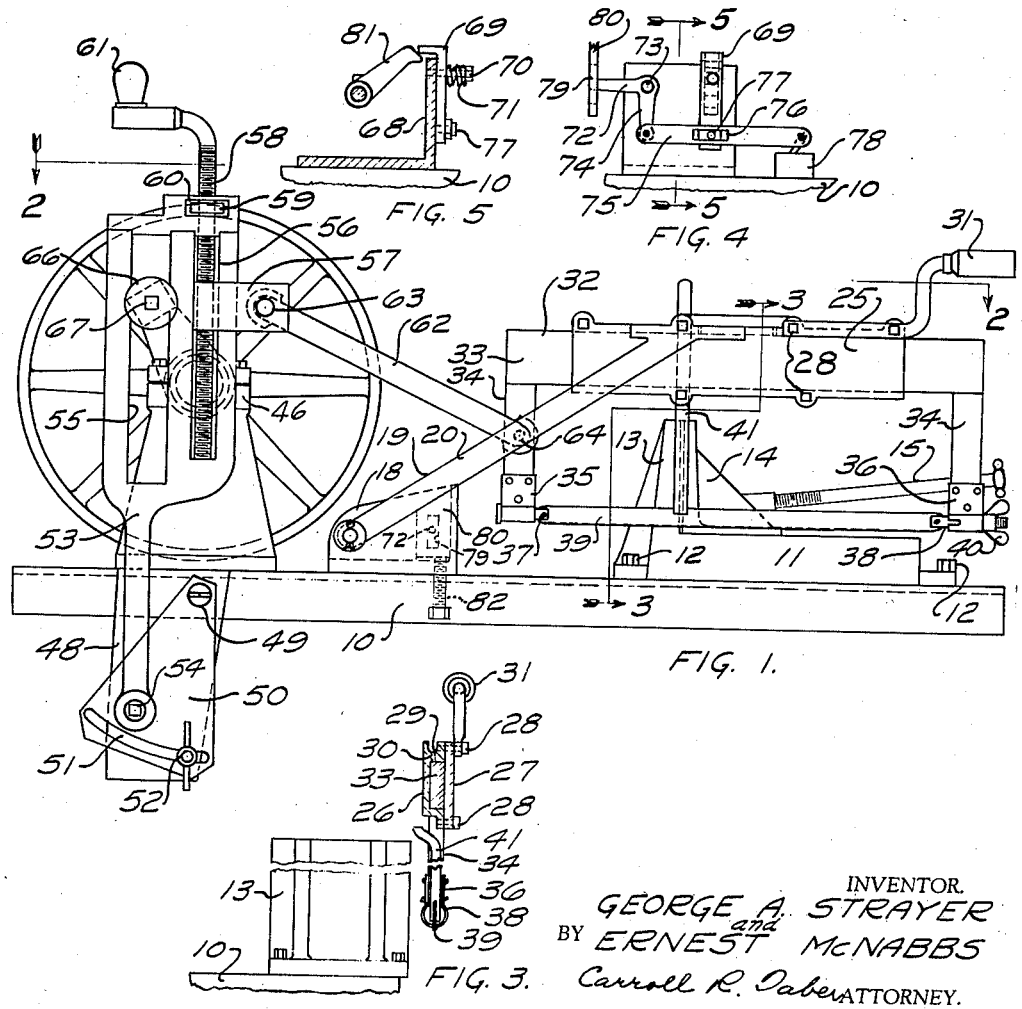
INVENTOR.
GEORGE A. STRAYER
and
BY ERNEST McNABBS
Carroll R. Daber ATTORNEY.

Patented June 3, 1941

2,244,029

UNITED STATES PATENT OFFICE 2,244,029

POWER SAW

George A. Strayer and Ernest McNabbs, Lansing, Mich.

Application May 25, 1938, Serial No. 209,946

3 Claims. (Cl. 29—73)

This invention relates to power saws, and more particularly to power saws of the reciprocating type, such as hack saws, and the like.

It is well known that reciprocating saws, particularly saws employed for cutting metal, should be lifted from the work on the reverse stroke in order that the blades will not become prematurely dull. On the other hand, the saw should be pushed down against the work on the cutting stroke. Heretofore various mechanisms have been employed for performing these functions, but all of them have been additions to the saw mechanism, thereby tending to make the apparatus more complicated and costly. This invention overcomes the defects of prior mechanisms of this type by a novel arrangement of parts, such that the above mentioned functions are inherent in the operating mechanism of the saw.

It is an object of the invention to provide in a saw of the aforementioned type a mechanism for driving the same so arranged that the saw is forced against the work on the cutting stroke and lifted from the work on the reverse stroke. Another object of the invention is to provide a saw in which the relative speeds of the saw on the cutting stroke and reverse stroke may be varied. Still another object is to provide a saw in which the pressure applied during the cutting stroke may be varied according to the hardness and thickness of the metal to be cut. A still further object is to provide a mechanism which will automatically turn the power on and off at the desired time, as well as support the saw in its inoperative position. A still further object is to provide a saw which is simple and rugged, and may be economically manufactured.

These objects and others ancillary thereto will appear more fully in the following description when read in connection with the accompanying drawing, in which like numerals designate corresponding parts in the several views.

In the drawing:

Figure 1 is a front elevational view of a power saw embodying my invention;

Figure 2 is a top plan view of the structure shown in Figure 1;

Figure 3 is a fragmentary cross-sectional view taken on substantially the line 3—3 of Figure 1;

Figure 4 is an end elevational view of the switch operating mechanism shown in Figure 1, the view being taken in the direction of the arrow; and Figure 5 is a cross-sectional view taken substantially on the line 5—5 of Figure 4.

Referring now more specifically to the drawing, it will be seen that the invention embodies a table 10 on which the various elements of the saw are mounted. This table is adapted to be supported on suitable legs (not shown) in any conventional manner. Mounted on the table 10 adjacent the right hand end in Figures 1 and 2 is a work holding vise 11 of any suitable construction, which is rigidly bolted to the table 10 by bolts 12. The vise consists of a stationary jaw 13 and a movable jaw 14, the latter being controlled by means of a hand screw 15.

An angle bracket 16 is rigidly secured to the table 10 by any suitable means, such as rivets or bolts 17. Pivoted on the upright flange 18 of the angle bracket 16 is a supporting arm 19 for the saw. This supporting arm consists of two arms 20 and 21, which straddle the upright leg 18 of the angle bracket, and are pivoted thereto by a shaft 22 passing through both arms 20 and 21 and the flange 18 of the bracket 16. The arm 21 is rigidly secured by means of pin 23 to the shaft 22 whereby pivotal movement of the arms 20 and 21 will rotate the shaft 22.

A bolt 82 is threaded through the base of the angle bracket 16 directly beneath the arm 21. It forms a stop to prevent undue downward movement of the saw. Thus, if it is not desired to cut completely through the work, the depth of cut may be readily adjusted by merely rotating the bolt.

It will be noted particularly from Figure 2 that the arms 20 and 21 are spread apart intermediate their ends to form an elongated slot 24 for a purpose which will presently appear. The arms 20 and 21 are attached to a guide frame 25 for the saw. The guide frame is shown best in Figure 3. It consists of an inner channel shaped plate 26 and an outer plate 27, secured together by a plurality of bolts 28. If desired, the arms 20 and 21 may be made integral with the plates 27 and 26 respectively. The arms 20 and 21 are preferably arranged at an angle to the guide frame. This angle is preferably about 23° but may be varied slightly if desired.

The channel shaped plate 26 is provided with a cavity 29 into which lubricating oil may be poured, and oil holes 30 communicate with the interior of the guide for lubricating the saw. A handle 31 is secured to the guide frame, thus providing means for manually lifting the saw from the work.

The saw proper is designated by the numeral 32. It consists of a back 33 of rectangular cross-section, which is slidable in the guide frame. At each end of the back 33 are depending legs 34. At the lower ends of the legs 34 are conventional brackets 35 and 36 for the reception of securing posts 37 and 38 for supporting the saw blade 39. The post 38 is threaded at its outer end to receive a wing nut 40, whereby the tension of the saw blade 39 may be readily adjusted. The construction of the blade supports is similar to those of conventional hack saws.

An auxiliary guide 41 for the saw blade 39 is secured to the guide frame adjacent the jaws 13 and 14 of the vise. The lower end of the auxiliary guide 41 is provided with a longitudinal slot which slidably receives the saw blade. It will be noted that this guide 41 backs up the saw blade at approximately the location of the work to be cut, and thereby prevents undue blade breakage.

Adjacent the left hand end of the table 10 is the driving mechanism for the saw. A motor 42 is connected by a shaft 43 to reduction gears housed in a gear box 44. A crank shaft 45 extends from the gear box and is supported in a bearing 46. A fly wheel 47 is keyed or otherwise securely fastened to the shaft 45 in order to reduce vibration. The fly wheel is desirable but not essential to the operation of the machine.

A bracket 48 depends from the side of the table 10, and pivoted at 49 on the bracket 48 is a generally triangular plate 50. Near its lower end the plate 50 has an arcuate slot 51 concentric with the axis of the pivot 49. A wing nut 52 is threaded into the bracket 48 and extends through the arcuate slot 51. It will be readily appreciated that the plate 50 may be swung about the pivot 49 to any one of a plurality of positions within the limits of the slot 51 and clamped in any desired position by means of the wing nut.

A rocking lever 53 is pivoted at 54 on the plate 50. This lever has an elongated slot 55 directly in line with the pivot 54. The purpose of the slot will appear later. A second slot 56 is also provided in the lever 53 and slidable in this slot is a block 57. The block 57 is drilled and tapped to receive a threaded shaft 58 extending lengthwise of the slot 56. A ring 59 located in a slot 60 adjacent the upper end of the lever 53 is securely attached to the threaded shaft 58 so that the shaft 58 may rotate, but is prevented from moving lengthwise of the slot. A crank handle 61 provides a means for rotating the shaft 58. It will be apparent that as the crank 61 is rotated the block 57 will move up or down with respect to the lever 53.

A connecting rod 62 is pivoted at 63 to the block 57 and is also pivoted at 64 to the leg 34 of the saw frame 32, whereby rocking motion of the lever 53 about its pivot 54 will be transmitted into reciprocatory motion of the saw.

The crank pin 65 of the crank 45 is inserted in the slot 55 in the lever 53 and is held in place by a small circular washer 66 attached to the end of the crank pin 65 by means of the bolt 67. Rotation of the crank will thus cause oscillatory motion of the lever 53.

The switch and support mechanism for the saw is shown best in Figures 2, 4 and 5. Extending upwardly from the base of the angle bracket 16 is a vertical plate 68. A member 69 of inverted L-shape is bolted to the plate by means of a bolt 70, and between the head of the bolt 70 and the member 69 is a coiled spring 71 which is always under compression. The aperture in the member 69 through which the bolt 70 extends is considerably larger than the bolt 70 so that a limited amount of universal movement of the two may be had. A bell crank having arms 72 and 74 is pivoted at 73 to the plate 68. The depending arm 74 of the bell crank is pivoted to a link 75. This link has a slot 76 therein which loosely embraces a pin 77 rigidly attached to the lower end of the L-shaped member 69. The end of the link 75 remote from the bell crank is pivoted to the switch lever of a conventional toggle switch 78. The generally horizontal end of the bell crank 72 is inserted in a slot 79 in a lug 80 which depends from the inner arm 21 of the saw guide support. This lug has a vertically elongated slot therein to allow considerable lost motion between the bell crank arm and the lug 80.

Securely fastened to the shaft 22 is a cam member 81. This cam member is rotatable with the arms 20 and 21 and shaft 22.

The operation of the device is as follows: The crank shaft 45 and crank 65 are rotated by means of the motor 42 through the reduction gears 44. This rotary motion of the crank 65 imparts an oscillatory motion to the lever 53 about the pivot 54, and such oscillatory motion is transmitted through the link 62 to the saw 32 which reciprocates longitudinally in the guide 25 and between the arms 20 and 21. The cutting stroke of the saw is from left to right, as shown in Figure 1, and the reverse stroke from right to left. The crank shaft 65, of course, may be rotated in either direction by reversing the direction of rotation of the motor.

Due to the angle between the arms 20 and 21 and the connecting rod 62 there will always be a downward component of pressure on the saw during the cutting stroke and an upward component during the reverse stroke. These upward and downward components may be increased or decreased by rotating the shaft 58 and thereby moving the block 57 up or down. This will, of course, change the angle between the connecting rod 62 and the arm 19. This is desirable because the depth of cut at each stroke should be varied according to the thickness or hardness of the metal to be cut.

At times it is desirable to increase the speed of the saw during the cutting stroke and decrease the speed of the reverse stroke, or vice versa. This may be easily accomplished by loosening the wing nut 52 and shifting the plate 50 about its pivot 49 to a new position, where it is again securely clamped by the wing nut. The shifting of the plate 50 changes the position of the pivot 54 of lever 53 relative to the crank shaft 45. It will be obvious that the elapsed time for a complete cycle of movement of the saw can only be varied by changing the speed of the motor, but the velocity of the saw at any given part of the cycle may be varied as above described. The relative speeds of the cutting stroke and reverse stroke of the saw may also be varied by reversing the direction of rotation of the motor.

The switch 78 is operated by upward and downward motion of the saw guide 25. Assuming that the switch is in the "off" position when the parts are located as shown in Figures 4 and 5, the switch may be thrown to the "on" position by merely lifting the guide 25 through the medium of the handle 31. This movement will rotate the shaft 22, thereby swinging the cam 81 counterclockwise, as viewed in Figure 5, which will force the L-shaped lever 69 to the right against the action of the spring 71 until the cam 81 clears the member 69. The member 69 will then snap back to the position shown in Figure 5. Of course, in the meantime, the lug 80 will be moved upwardly and the bell crank 74 will be rotated clockwise, as viewed in Figure 4, to a certain extent, but due to the lost motion in the slots 79 and 76 there will be no rotation of the L-shaped member 69 about the bolt 70.

The saw may now be lowered until the free end of the cam 81 rests on the horizontal portion of the L-shaped member 69 and the saw will then be supported free of the work in that position. Continued upward movement of the saw frame 25 and arms 20 and 21 will eventually cause the right hand end of the slot 76, as shown in Figure 4, to engage the pin 77 and swing the L-shaped member 69 clockwise, as seen in Figure 4, about the bolt 70. At the same time the switch 78 is thrown to the "on" position. The saw will then commence to operate, and inasmuch as the member 69 has been rotated somewhat clockwise, the horizontal portion thereof will no longer be beneath the cam 81 so that the cam will clear the member 69 and allow the saw to be brought down in contact with the work. As soon as the saw has cut through the work the bell crank 79 will have been swung counter-clockwise, as viewed in Figure 4, thus swinging the member 69 to its vertical position and throwing the switch lever of the switch 78 to its "off" position.

It will readily appear from the foregoing description that we have provided a saw which is a marked improvement on previous devices of this general type. Due to the novel construction of this invention, it is unnecessary to use any coolant or lubricant on the saw blade while it is cutting even the hardest of steels. Also, it is possible to employ common hack saw blades in the saw for cutting most materials, thus doing away with the necessity of using blades made of expensive high speed steel, which must be used in other types of power hack saws. Ordinary hack saw blades for use in hand hack saws have an exceptionally long life when used with this invention, and the cuts made in even the hardest steels are always straight and true.

It will be evident, of course, that although only one embodiment of the invention has been disclosed, it is susceptible of considerable variation. Consequently, the invention is to be limited only by the scope of the appended claims.

We claim:

1. A power saw comprising a support, a work holder mounted on the support, said work holder having a movable jaw, a guide frame pivoted on the support and located adjacent a side of the work holder, a saw mounted in the guide frame for reciprocatory movement transversely of the work holder, a lever pivoted at its lower end to the support and extending freely upwardly therefrom, the pivotal connection of the lever with the support being adjustable longitudinally thereof independently of the movement of said jaw, a link pivotally connected at one end to the saw and at the other end to the lever at a level above the point of connection with the saw, the connection of the link with the lever being adjustable longitudinally of the lever, and means for oscillating the lever.

2. A power saw comprising a support, an arm pivotally connected at one end to the support and inclining upwardly therefrom, a guide frame rigidly connected to the other end of the arm and extending substantially horizontally therefrom, a saw mounted for reciprocatory movement in said guide frame, a lever pivoted at its lower end on said support and extending freely upwardly therefrom, a link pivotally connected at one end to said saw at a level a substantial distance above the pivotal connection of the arm and the support, the other end of said link being pivotally connected to said lever at a level above the level of the pivotal connection between the link and the saw whereby upon swinging movement of the lever in a direction away from the saw a force is exerted upon the latter tending to lift the same and upon swinging movement of the lever in the opposite direction a force is exerted tending to force the saw downward.

3. A power saw comprising a support, an arm pivotally connected at one end to the support and inclining upwardly therefrom, a guide frame rigidly connected to the other end of the arm and extending substantially horizontally therefrom, the angle between said arm and said guide frame being approximately 23 degrees, a saw mounted for reciprocatory movement in said guide frame, a lever pivoted at its lower end on said support and extending freely upwardly therefrom, a link pivotally connected at one end to said saw at a level a substantial distance above the pivotal connection of the arm and the support, the other end of said link being pivotally connected to said lever at a level above the level of the pivotal connection between the link and the saw whereby upon swinging movement of the lever in a direction away from the saw a force is exerted upon the latter tending to lift the same and upon swinging movement of the lever in the opposite direction a force is exerted tending to force the saw downward.

GEO. A. STRAYER.
ERNEST McNABBS.